(12) United States Patent
Espinosa Morales et al.

(10) Patent No.: US 12,177,544 B2
(45) Date of Patent: Dec. 24, 2024

(54) CAMERA MODULE FOR VEHICLES

(71) Applicants: FICOMIRRORS S.A.U., Barcelona (ES); HONDA MOTOR CO., LTD., Tokyo (JP)

(72) Inventors: José Manuel Espinosa Morales, Viladecavalls (ES); David Gómez Timoneda, Viladecavalls (ES); José Mendoza Viciosa, Viladecavalls (ES); Makoto Sawada, Saitama (JP); Hidemasa Sugai, Saitama (JP)

(*) Notice: Subject to any disclaimer, the term of this patent is extended or adjusted under 35 U.S.C. 154(b) by 12 days.

(21) Appl. No.: 17/633,934

(22) PCT Filed: Aug. 9, 2019

(86) PCT No.: PCT/EP2019/071484
§ 371 (c)(1),
(2) Date: Feb. 8, 2022

(87) PCT Pub. No.: WO2021/028009
PCT Pub. Date: Feb. 18, 2021

(65) Prior Publication Data
US 2022/0294936 A1 Sep. 15, 2022

(51) Int. Cl.
*H04N 23/51* (2023.01)
*B60R 11/04* (2006.01)
*H04N 23/54* (2023.01)

(52) U.S. Cl.
CPC .............. *H04N 23/51* (2023.01); *B60R 11/04* (2013.01); *H04N 23/54* (2023.01)

(58) Field of Classification Search
None
See application file for complete search history.

(56) References Cited

U.S. PATENT DOCUMENTS

| 10,009,521 B2 | 6/2018 | Seger |
| 10,277,786 B1 | 4/2019 | Leonelli, Jr. |

(Continued)

FOREIGN PATENT DOCUMENTS

| CN | 106464792 A | 2/2017 |
| CN | 108111719 A | 6/2018 |

(Continued)

OTHER PUBLICATIONS

International Search Report for related patent application PCT/EP2014/071484 issued by the European Patent Office and mailed Mar. 16, 2020, in English.

(Continued)

*Primary Examiner* — Eileen M Adams
(74) *Attorney, Agent, or Firm* — Hassan Abbas Shakir; Shakir Law PLLC

(57) ABSTRACT

A camera module attaches a camera to a motor vehicle. The camera module includes a camera unit having an optical axis, and a support configured for accommodating the camera. The support has a main positioning surface transverse to the optical axis, such as when the camera is mounted with the support, the front contact surface of the camera and the main positioning surface are in contact. A cover is attachable to the support to retain the camera pressed against the support in a direction parallel to the optical axis. First pressure means are provided in the cover or in the support, and as when the cover is fastened with the support, the pressure means press the camera unit against the support in a direction parallel to the optical axis (X) or perpendicular to the main positioning surface.

20 Claims, 10 Drawing Sheets

(56) References Cited

U.S. PATENT DOCUMENTS

| | | | |
|---|---|---|---|
| 10,518,717 B2 | 12/2019 | Zurowski | |
| 2015/0281650 A1* | 10/2015 | Mohan | G03B 17/08 348/143 |
| 2017/0187931 A1 | 6/2017 | Onishi et al. | |
| 2018/0316833 A1 | 11/2018 | Okuda | |
| 2019/0243085 A1* | 8/2019 | Koyama | G03B 17/561 |

FOREIGN PATENT DOCUMENTS

| | | |
|---|---|---|
| EP | 2 722 234 A1 | 4/2014 |
| EP | 3 632 745 A1 | 4/2020 |
| JP | 2014080081 A | 5/2014 |
| JP | 2018012387 A | 1/2018 |
| JP | 2018189773 A | 11/2018 |
| JP | 2019051769 A | 4/2019 |
| WO | 2015185431 | 12/2015 |

OTHER PUBLICATIONS

Written Opinion of the International Searching Authority for related patent application PCT/EP2014/071484 issued by the European Patent Office and uploaded to WIPO Patentscope Feb. 18, 2021, in English.

Office Action in related Chinese Patent Application 201980099045X prepared by National Intellectual Property Administration, PRC and dated Feb. 8, 2024, reference document 15 pgs., including 3 page summary translation.

Office Action in related Japanese Patent Application 2022-508548 prepared by the Japanese Patent Office and dated Jul. 10, 2023, 6 pgs, translation provided.

* cited by examiner

A-A

B

CAMERA MODULE FOR VEHICLES

BACKGROUND OF THE INVENTION

1. Field of the Invention

The present invention is directed to the construction of camera modules or assemblies to be attached to a surface of a motor vehicle, for capturing images of the surroundings.

2. Discussion of the Related Art

Automotive camera modules are widely used for various purposes, for example in autonomous vehicles, in driving-assisted systems to assist drivers while parking, or in the detection of obstacles in the vehicle surroundings. For example, a camera module can be mounted at the rear of a vehicle to provide backwards vision while a vehicle is being parked, or as a complementary or replaceable element of exterior side mirrors.

Camera modules typically include a camera unit and a housing for securing the camera unit to a vehicle surface, such as the camera unit and the support are assembled together into a single module or assembly for its installation on a vehicle during the vehicle manufacturing process. For example, a camera module conventionally includes an optical assembly incorporating lens and an optical sensor defining a camera optical axis. The housing has two parts, namely front and rear housing parts, such as these parts are axially assembled in the direction of the optical axis, thus the camera unit is retained axially between the two parts of the housing.

The front housing part has a circular window to receive the camera lens, and the rear housing part includes another window to provide access for a wire harness connected to the sensor electronics of the camera.

The U.S. Pat. No. 10,277,786 A1 describes a conventional camera module assembly, that requires four screws to fasten the two parts of the housing. These screws are screwed in a parallel direction to the optical axis, thus, they are accessible only from the rear area of the camera module where the camera wire harness is typically placed. This position of the screws, makes difficult for an operator to get access to the screws during the camera module assembly process.

Therefore, conventional camera modules have the drawback that they require a large number of screws for their assembly, that are difficult to reach because they are placed at the module rear part, so the camera module installation process is cumbersome, time consuming and costly.

On the other hand, for the correct operation of the camera it is essential to ensure that the optical axis is correctly aligned despite the vehicle vibrations.

Due to the increasing demand of camera modules in the manufacture of motor vehicles and their increasing relevance for safe driving, there is a need for camera modules that can be easily installed and assembled with a reduced number of components, so as to reduce manufacturing time and costs, and to ensure a perfect alignment of the optical axis.

SUMMARY OF THE INVENTION

An object of the invention is to provide a camera module that can be constructed with a reduced number of components, and that can be easily installed in a vehicle in order to reduce manufacturing time and costs.

An additional object of the invention is to provide a camera module that is compact and that ensures correct alignment of the camera optical axis.

The invention satisfactorily solves the above-mentioned drawbacks of the prior art.

An aspect of the invention refers to a camera module for vehicles, comprising: a camera unit that in turn comprises a camera housing and an optical system that define an optical axis which is fitted inside the camera housing. The camera housing has an external front contact surface at a front part of the camera housing, so that this front contact surface is transverse, to the optical axis. In this description, transverse is to be understood a plane or a line that intersects or cut another plane or line in any angle, that is, a plane or a line that it is not parallel to other plane/s or line/s. Preferably, the front contact surface and the optical axis, are orthogonal, being orthogonal a particular case of the transverse arrangement wherein the optical axis is normal to the front contact surface.

The camera module additionally comprises a support configured to be attached to a surface of a vehicle, and a cover attachable to the support and configured to retain the camera unit pressed against the support when the support and the cover are fastened together.

The support is additionally configured for accommodating the camera unit in a predefined operating position. For that, the support has a main positioning surface defining a main reference plane which is transverse to the optical axis, such as when the camera housing is operatively mounted with the support, the front contact surface of the camera housing and the main positioning surface are in contact and pressed against each other to assure that the camera unit is placed in the correct position.

The camera module additionally comprises fastening means to attach the cover and the support together. The fastening means are configured and arranged, such as the cover can be fastened with the support, and preferably, the fastening means are configured to have a fastening direction transverse or inclined with respect to the optical axis.

The cover and/or the support are configured to press the camera unit towards the main positioning surface in at least a direction parallel to the optical axis and/or perpendicular to the main positioning surface. Preferably, the cover is configured to press the camera unit towards the main positioning surface in at least a direction parallel to the optical axis and/or perpendicular to the main positioning surface.

Preferably, the fastening means are two screws whose screwing axis are transverse to the optical axis, that is, the optical axis (X) is transverse to a plane that includes the screwing axes (which are parallel to each other). In cases in which the screwing axis are not parallel to each other, it can be defined that the screwing axis and the optical axis are skew lines because they are in different planes and they are not parallel.

With this arrangement, and taking into account that in a vehicle coordinate system the optical axis use to be in a substantially horizontal direction, the screws may be accessible from a top area of the module or a vertical direction from the vehicle coordinate system, instead of the rear part or an horizontal direction from the vehicle coordinate system as is the case of prior art modules wherein the electric terminals of the camera and wire harness are conventionally located. In this way, for the assembly process, the operator can approach the camera module from another direction than from the rear, and the screws are easily accessible by an operator using a tool like a screwdriver from a top view position.

As another advantage, the camera module additionally comprises at least one first pressure means for example: springs, rubber blocks, flexible plastic tabs or flexible metallic tabs, provided in the cover and/or in the support and configured such as when the cover is fastened with the support, the first pressure means press the camera unit against at least the main positioning surface, that is, against the main reference plane of the support, and in a direction parallel to the optical axis and/or perpendicular to the main positioning surface. Preferably, the first pressure means are provided in the cover.

The support and the cover may be configured and dimensioned, such as when the support and the cover are operatively coupled together, the cover may be pressed against the camera unit by the support, that is, the cover may be press-fitted with the support.

The support has a pressure control element that places the cover at a determined distance to the main positioning surface to achieve that the first pressure means of the cover pushes the camera unit with a determined force to the main positioning surface, and the cover is dimensioned to fit between the camera unit and the pressure control element. Preferably, at least one control element has two consecutive guiding surfaces each one with different inclinations for guiding the cover while it is being coupled with the support.

In a preferred embodiment, the support has at least a portion with a generally L-shaped configuration (in a cross-sectional view) having a vertical part and a horizontal part, the vertical part having the main positioning surface. In a preferred embodiment, the cover also has at least a portion with a L-shaped configuration (in a cross-sectional view) having a vertical part and an horizontal part, and the support and the cover are configured such as when they are fastened, the vertical parts of the support and the cover are generally parallel to each other, and the horizontal parts of the support and the cover are generally parallel to each other. When the support and the cover are attached, they define together a chamber inside which the camera unit is immovably housed.

The cover has the first pressure means at the vertical part pressing the camera unit in a direction parallel to the optical axis and/or perpendicular to the main positioning surface, and preferably the cover also has second pressure means at the horizontal part pressing the camera unit to a second positioning surface of the support defined in the horizontal part of the support in a direction transverse to the optical axis. The second pressure means at the horizontal part, press the camera unit towards the second positioning surface, with a strength lower than the pressure made by the first pressure means provided in the vertical part of the cover to the camera unit against the main positioning surface.

Due to the arrangement and provision of the first and second pressure means both in the vertical and horizontal parts of the cover as described above, the cover at least press the camera unit in two transverse directions, one in a parallel direction to the optical axis and another one in a transverse direction to the optical axis. With this configuration of the module, the camera unit is secured in the module in a simple manner using only two screws.

In addition, the cover also include third pressure means at a lateral wall to press the camera unit against a third positioning surface of the support defined in a lateral side of the support in a direction transverse to the optical axis, and transverse to the pressing direction of the first pressure means of the horizontal part of the cover.

For example, the first and/or the second and/or the third pressure means comprise at least one flexible tab configured to contact and flex against the camera module to press the camera module when the cover is operatively fastened to the support.

In a preferred embodiment, the cover and the support have cooperating engaging means, for example a flexible tab that engages with a protrusion formed respectively in the cover and in the support (or vice versa), such as the cover and the support are pre-assembled and retained together before and while they are fastened.

The invention provides a camera module that can be easily installed manually in a vehicle, and that can be constructed in a cost effective manner with a reduced number of fastening means (e.g. screws), and ensuring at the same time that the camera optical axis would be perfectly aligned during the live span of the camera module.

In a preferred embodiment, the cover incorporates protruding members provided at an internal surface of the horizontal part of the cover so that when the cover and the support are operatively coupled, the protruding members contact and press on the camera unit in a direction transverse to the optical axis.

The invention also refers to a camera housing for vehicles incorporating a camera module as the one defined above, wherein the camera housing is adapted to be fixed on an external surface of a vehicle, and has an opening at which the lens of the camera unit is placed.

BRIEF DESCRIPTION OF THE DRAWINGS

Preferred embodiments of the invention are henceforth described with reference to the accompanying drawings, wherein:

FIG. 11B is a perspective view from below of the cover. An arrow indicates the contact are of an elastic tab of the cover with the camera unit when the cover is coupled.

FIGS. 14A-14D.—show several views of an external housing, wherein FIGS. 14A and 14B are perspective views, FIG. 14C is cross-sectional view, and FIG. 14D is a perspective view of the fixation base.

PREFERRED EMBODIMENT OF THE INVENTION

Figure 1:
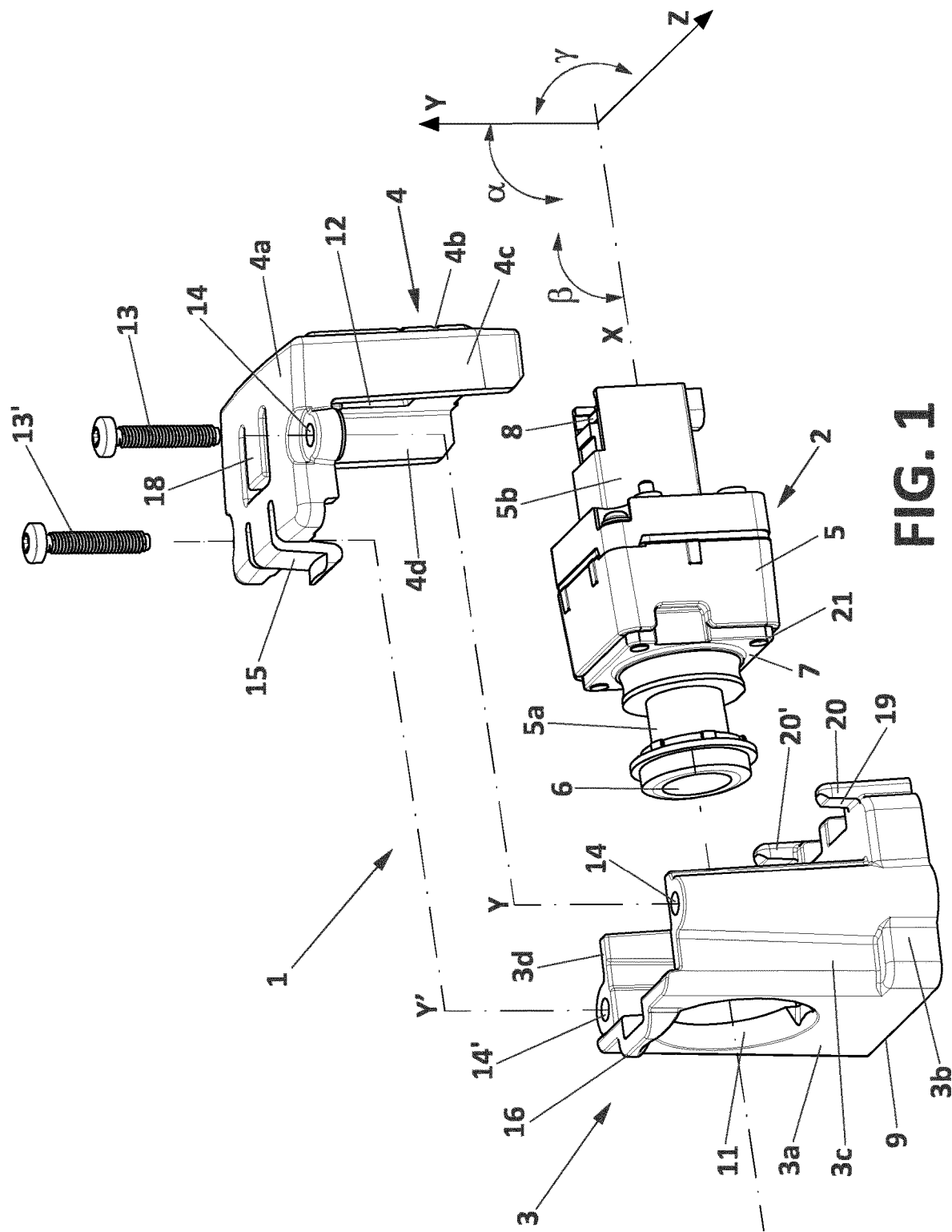
FIG. 1.—shows an exploded perspective view of a preferred embodiment of the invention, wherein the yaw ($\alpha$), pitch ($\beta$) and roll (y) impeded movements of the camera module are indicated in a three axis coordinates space.

FIG. 1 shows a preferred embodiment of a camera module (1) according to the invention, comprising a camera unit (2), a support (3) and a cover (4) attachable to the support (3) and configured to retain the camera unit (2) pressed against the support (3) when the support (3) and the cover (4) are fastened together. The camera unit (2) itself is conventional and it is not part of this invention.

The camera unit (2) comprises a camera housing (5) and an optical system fitted within the housing (5), the optical system including a lens (6) and an optical sensor (not shown) defining a camera optical axis (X). The camera housing (5) has front contact surface (7) formed externally at a front part of the housing (5) and orthogonally arranged with respect to the optical axis (X). The front contact surface (7) in this example is formed by four individual protrusions (21).

The camera housing (5) has a front part (5a) and a rear part (5b) placed at opposite sides of the housing (5) and linearly arranged with respect to the axis (X). The front part (5a) has the lens (6), and the rear part (5b) has electric terminals (8) of the camera, for the electric connection of the camera unit (2) to an external system (not shown).

The support (3) is configured for attaching the camera module (1) to a surface of a vehicle, for example through its lower surface (9) by conventional means. The support (3) is configured for receiving the camera unit (2) in a predefined operating position as shown for example in FIGS. 7 and 10. For that, the support (3) has a main positioning surface (10) internally formed in the support and defining a main reference plane (H) (shown in FIG. 10) transverse to the optical axis (X). When the camera unit (2) is operatively mounted with the support (3), the front contact surface (7) of the camera unit (2) and the main positioning surface (10) are in contact, as better shown in FIGS. 7 and 10, to assure the correct positioning of the camera unit (2) in the direction of the optical axis (X), impeding any displacements of the camera unit (5) in the optical axis (X) and any rotation in pitch and yaw angles.

Figure 9:
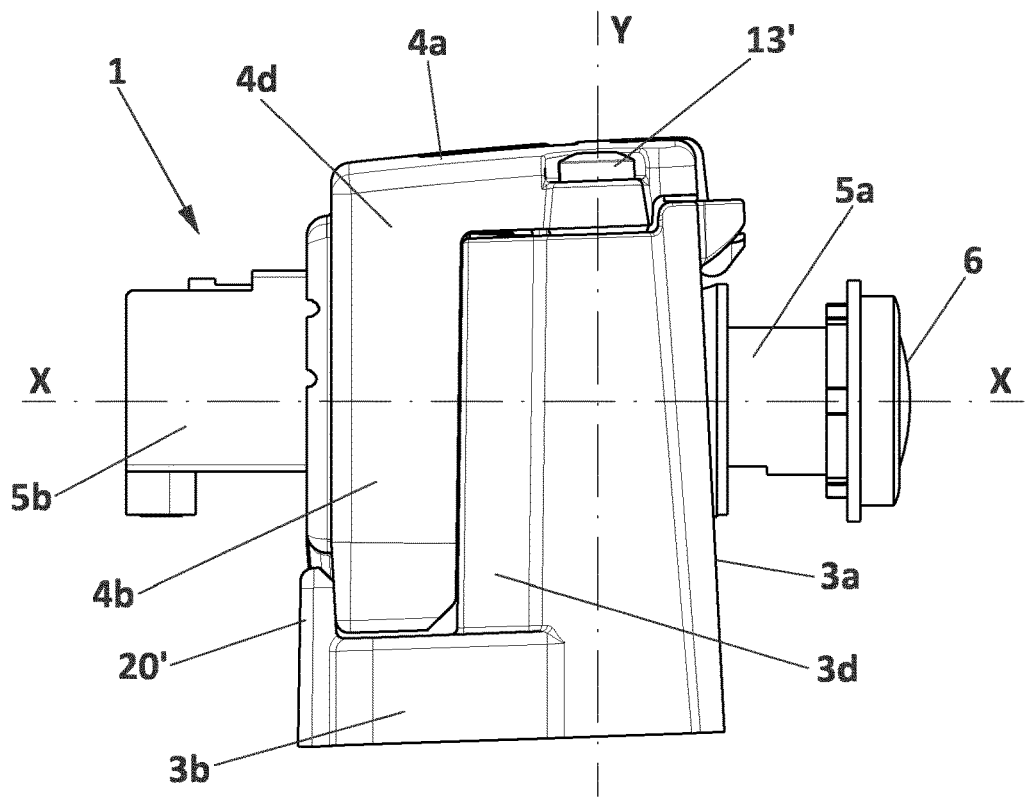
FIG. 9.—shows a side elevational view of the same embodiment.

As shown in FIGS. 1 and 9, the support (3) has a generally L-shaped configuration, having a vertical part (3a) and a horizontal part (3b), wherein the vertical part (3a) has the main positioning surface (10) and a front window (11) in the main positioning surface (10).

Figure 2:
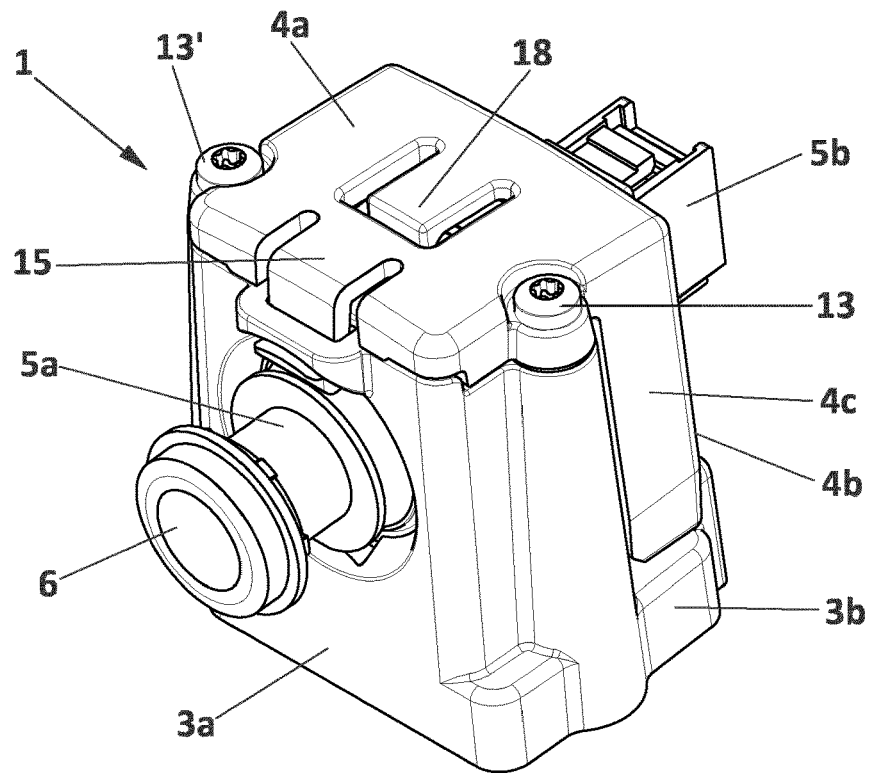
FIG. 2.—shows a perspective view of the camera module of FIG. 1 in an assembled state.
Figure 3:
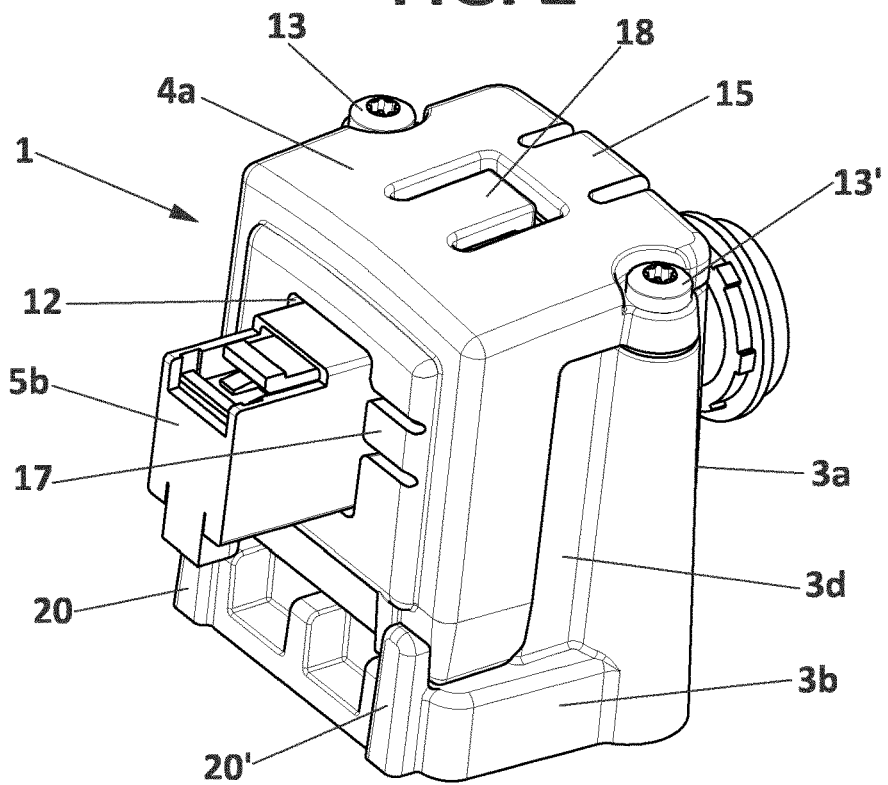
FIG. 3.—shows another perspective view of the camera module of FIG. 1.
Figure 4:
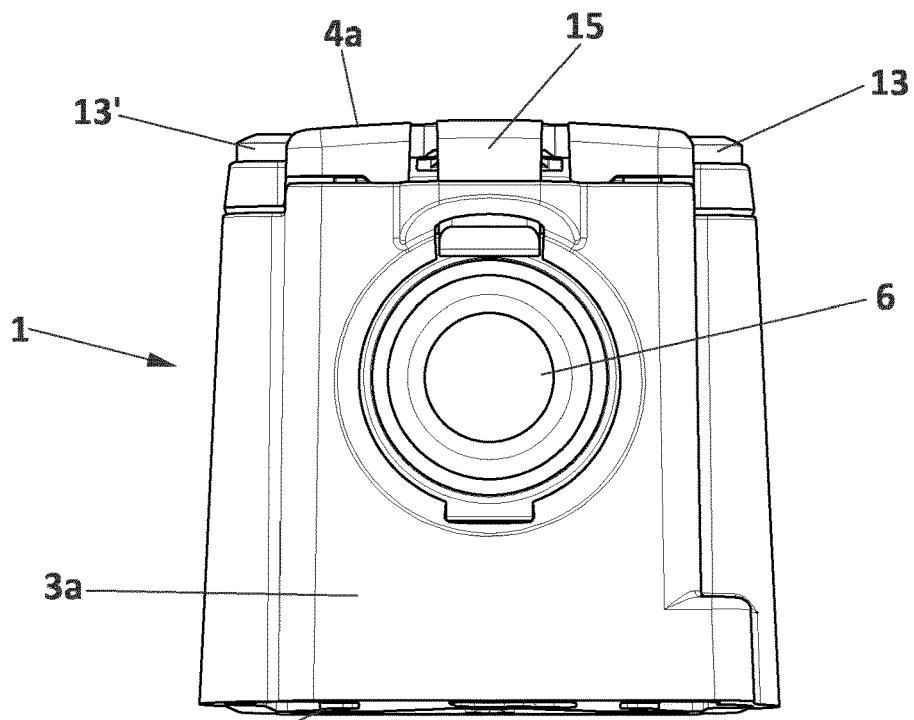
FIG. 4.—shows a front elevational view of the same embodiment.
Figure 5:
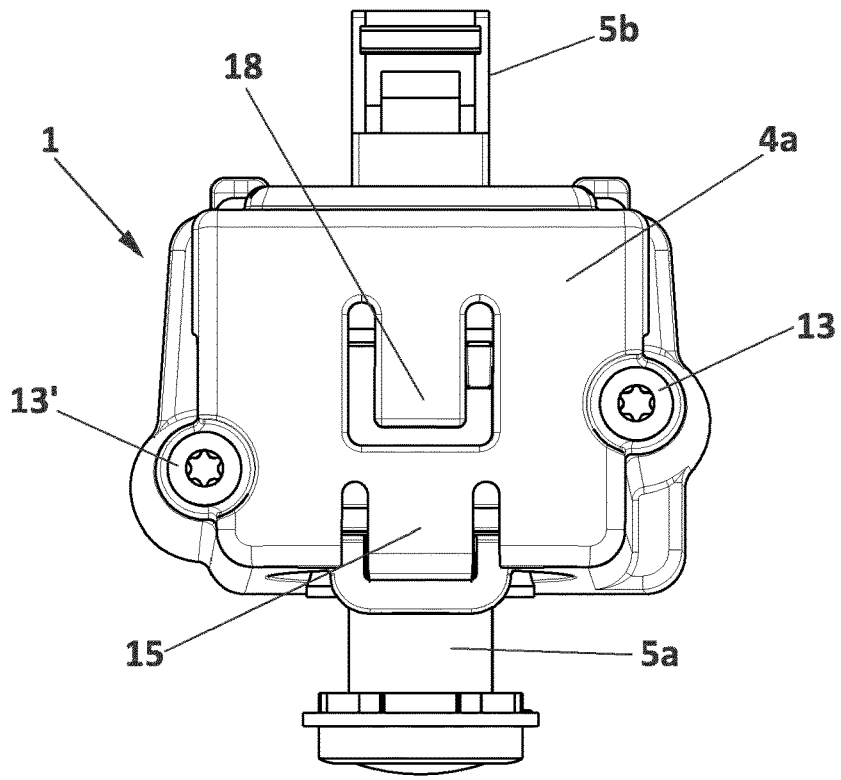
FIG. 5.—shows a top plan view of the same embodiment.

The cover (4) also has an L-shaped configuration having a vertical part (4b) with a rear window (12) and a horizontal part (4a). As shown in FIGS. 2, 3 and 9, the support (3) and the cover (4) are configured such as when they are coupled, the vertical parts (3a,4b) of the support and the cover are generally parallel to each other, and the horizontal parts (3b,4a) of the support and the cover are generally parallel to each other.

Figure 7:
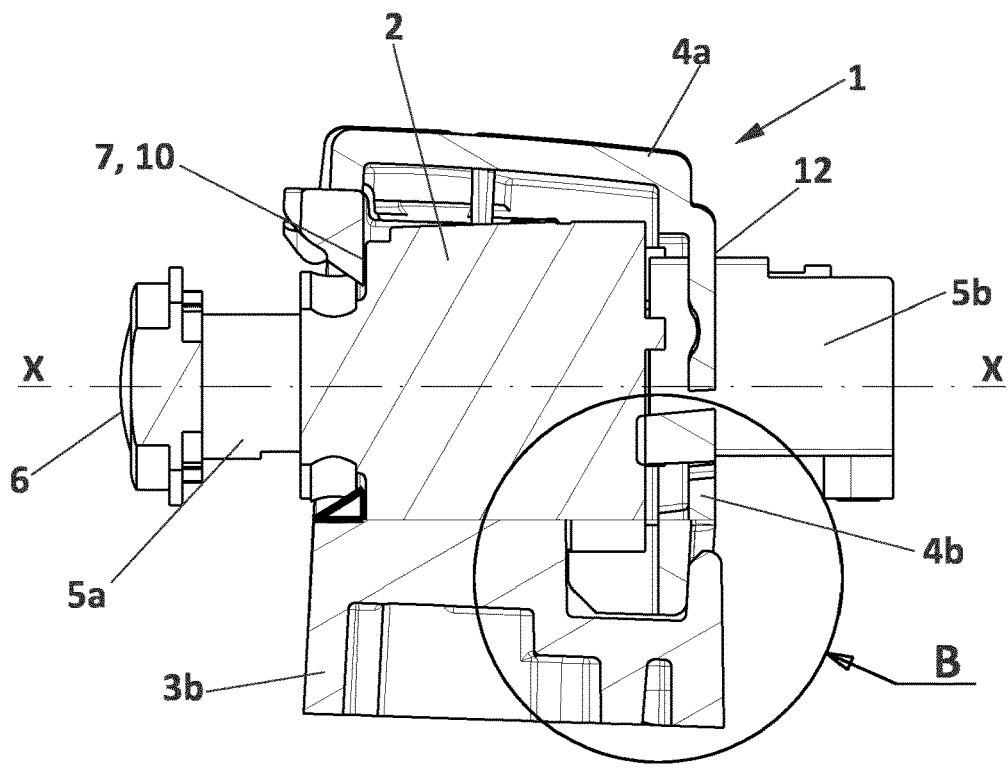
FIG. 7.—shows a cross sectional view taken along plane A-A in FIG. 6.
Figure 10:
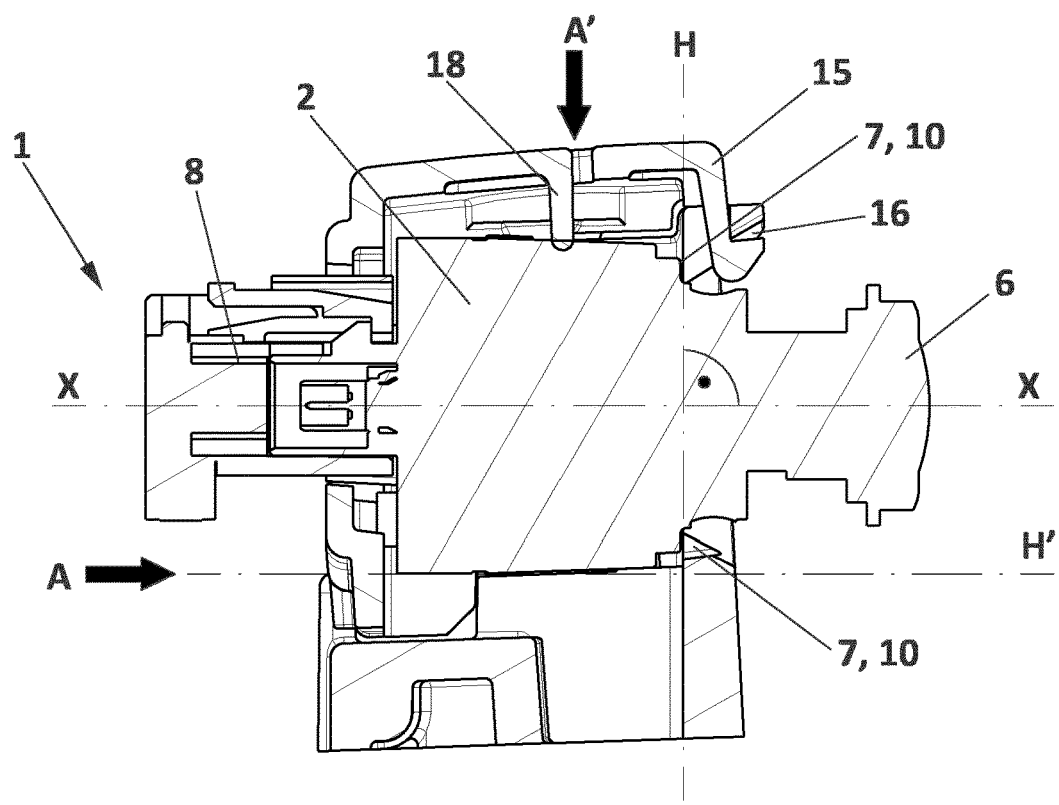
FIG. 10.—shows a cross sectional view taken along plane C-C in FIG. 6.
Figures 11A, 11B:
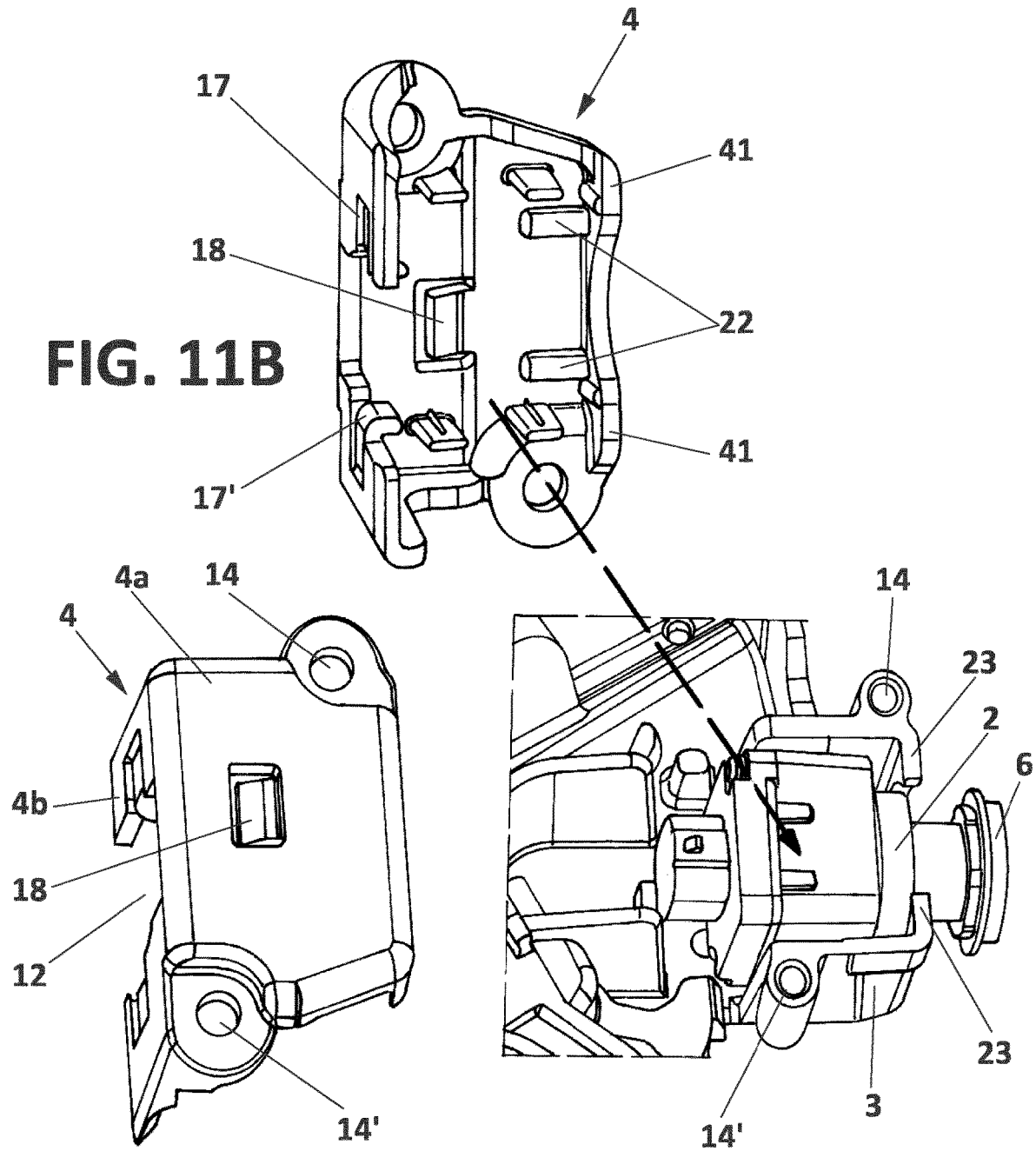
FIGS. 11a and 11b.—show a perspective view of another preferred embodiment of the invention, wherein in FIG. 11A the cover is shown in a pre-assembly position.

As shown in FIGS. 7, 9 and 10, the module (1) has a reduced volume, since the support and the cover define together a housing accommodating the camera unit (2), wherein the front part (5a) of the camera unit (2) passes through the front window (11) and protrudes outside the support (3), and the rear part (5b) of the camera unit (2) passes through the rear window (12) and protrudes outside the cover (4).

The fastening means to attach the support and the cover (3,4) consist of only two screws (13,13') and corresponding bores hole (14,14') passing through the cover (4) and the support (3). In this case, the axes (Y', Y) of the screws (13, 13') do not intersect with the optical axis (X), it can be defined that axes (Y', Y) are inclined or transverse (orthogonal in this case) to the optical axis (X). In other words, the optical axis (X) is transverse to a plane that includes axes (Y', Y) considering that in this exemplary embodiment, the screwing axis are parallel.

Therefore, the cover (4) is fastened with the support (3) in a direction (the direction of the screws axes (Y', Y)) transverse to the optical axis (X), and the cover (4) presses the camera unit (2) against the main positioning surface (10) in a direction parallel to the optical axis (X) and/or perpendicular to the main positioning surface (10).

Therefore, the screws (13,13') are easily accessible from an area above the horizontal part (4a) of the cover (4), that is, away from the rear part (5b) of the camera unit (2) where the camera connectors and wire harness are typically placed. Additionally, this arrangement of the screws (13,13') allow the installation of the camera module (1) in confined spaces of a vehicle, since less volume is required at the rear area of the camera module.

Figure 6:
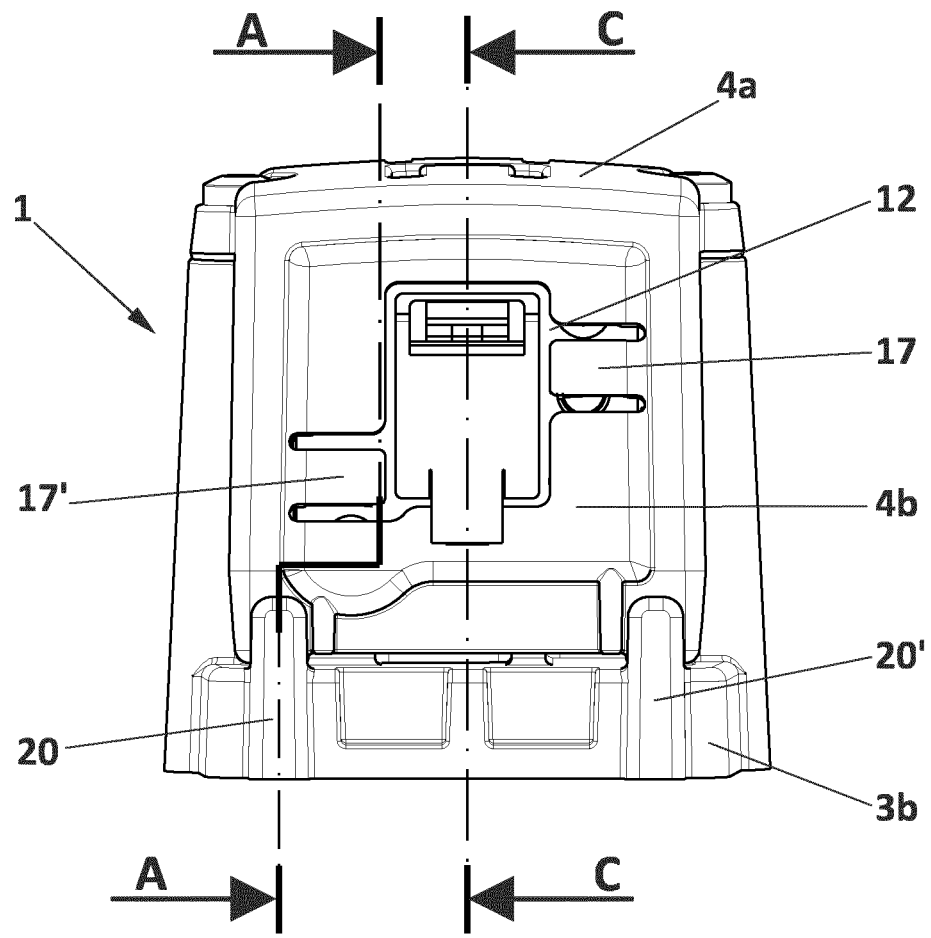
FIG. 6.—shows a rear elevational view of the same embodiment.

As shown in FIG. 6, first pressure means are provided in the cover (4). The first pressure means comprise at least one flexible tab (17, 17'). In this embodiment, two flexible tabs (17,17') are placed respectively at the two lateral sides of the vertical part (4b) of the cover (4). These two flexible tabs (17,17') are configured such as when the cover (4) is fastened with the support (3), they press the camera unit (2) against the main positioning surface (10) of the support (3) in the same or a parallel direction of the optical axis (X) and/or perpendicular to the main positioning surface (10), that is, in a direction perpendicular to the main reference plane (H), along the optical axis (X). The cover (4) is designed, such as the pressure exerted by the flexible tabs (17,17') is enough to prevent any displacement of the camera unit (2) at least along the axis (X) and any rotation in pitch ($\beta$) and yaw ($\alpha$) angles.

The cover (4) also comprises a front flexible tab (15) at a front edge of its horizontal part (4a) which cooperates with a protrusion (16) formed at the top edge of the vertical part (3a) of the support (3), in such a way that the front flexible tab (15) flexes to engage with the protrusion (16), to retain the cover (4) and support (3) engaged before and during the screwing process. For an operator, is very convenient to have the two components, cover (4) and support (3) pre-assembled during the screwing operation, because it is not necessary to hold manually the two components together and the screwing can be carried out with only one hand. The flexible tab (15) coupling with the protrusion (16), is designed to at least withstand the pressure exerted in the direction of the optical axis (X) by the flexible tabs (17,17').

Additionally, the support (3) is configured to define at least a secondary reference plane (H') or secondary positioning surface (shown in FIG. 10) defined in the horizontal part (3b) of the support (3) that is parallel to the optical axis (X). The cover (4) further comprises second pressure means, in the embodiment, another flexible tab (18) configured such as when the cover (4) is fastened with the support (3), the flexible tab (18) presses the camera unit (2) by flexible force against the secondary positioning surface in a direction transverse to the optical axis (X) and also transverse to the secondary reference plane (H'). The pressure exerted by the flexible tab (18) is enough to prevent any displacement of the camera unit (2) at least along the axis (Y) and rotation in roll angles.

Therefore, due to the support (3) and cover (4) configuration described above in combination with the arrangement of the screws (13,13'), only two screws (13,13') are necessary for the assembly of the camera module (1), since the cover (4) presses the camera unit (2) in two transverse directions (A,A') indicated by the arrows in FIG. 10.

The cover (4) may be a unitary body integrally obtained from a plastic or metallic material, for example by injection molding or 3D printing manufacturing process. Therefore, the tabs (15, 17,17', 18) may be integrally formed with the cover (4).

The support (3) may be metallic or plastic, and it may be also formed as an integral unitary body. In other practical embodiments, the cover and/or the support are obtained as a combination of metal and plastic.

The support (3) has a set of control elements (20,20'), in the embodiment two, extending vertically from the horizontal part (3b) of the support (3), the control elements (20,20') having a rear surface (19) that is faced to the main positioning surface (10). The rear surface (19) in this embodiment is parallel to the main positioning surface (10), but it does not ruled out any other possible angle, and the rear surface (19) is configured for externally contacting with the vertical part (4b) of the cover (4).

Figure 8:
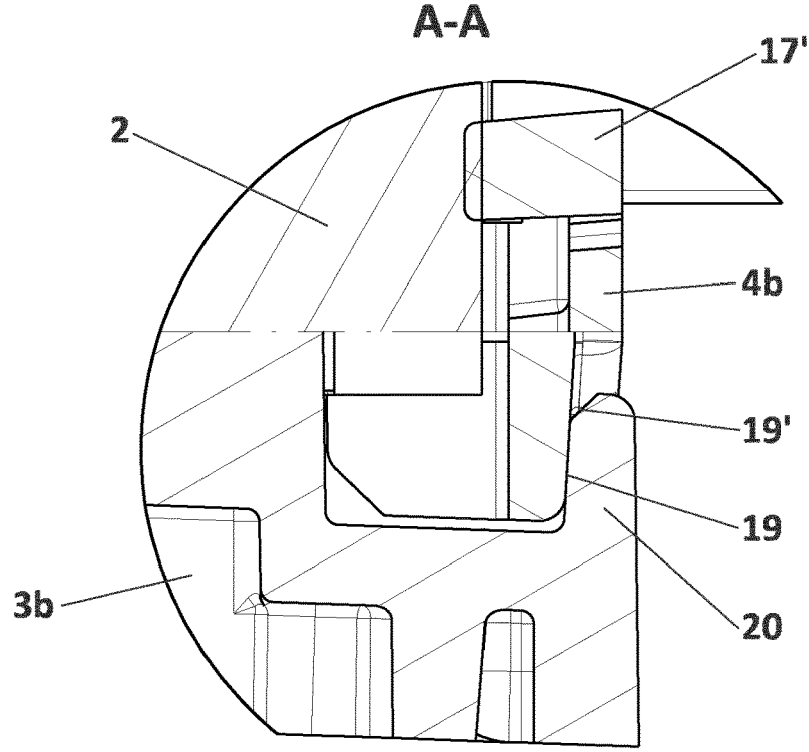
FIG. 8.—shows an enlarged detail B taken from FIG. 7.

Preferably and as shown in FIGS. 7 and 8, the control elements (20,20') having two consecutive surfaces or ramps (19,19') each one with different inclination with the purpose of guiding the cover (4) while it is being coupled the support (3) to it permanent and final position.

As an example, the cover (4) is dimensioned to fit between the rear surface (19) and the camera unit (2). Also, the cover (4) may be dimensioned to fit between the rear surface (19) and the camera unit, such the cover (4) is pressed against the camera unit.

The support (3) has at least one lateral wall (3c, 3d), the embodiment shows two lateral walls (3c,3d) that be parallel to each other and that are joined with the vertical and horizontal parts (3a,3b) of the support (3). These lateral walls (3c,3d) project orthogonally from the vertical part (3a) of the support (3).

Similarly, the cover (4) has at least one lateral wall (4c,4d), the embodiment shows two lateral walls (4c,4d) that may be parallel to each other and that are joined with the vertical and horizontal parts (4a,4b) of the cover (4). These lateral walls (4c,4d) project orthogonally from the vertical part (4b) of the cover (4).

Additionally, at least one lateral wall (4c,4d) of the cover (4) includes third pressure means, for example tabs (not shown) similar to the tabs (17,17'), configured to press the camera module (2) against a third positioning surface defined in one of the lateral walls (3c,3d) of the support (3) in a direction transverse to the optical axis (X) as to impede displacement of the camera module (2) in the direction of axis (Z) shown in FIG. 1.

The fastening means place the horizontal part (4a) of the cover to a determined distance to the secondary positioning surface, therefore the fastening means could be understood as other set of control means.

Additional set of control means are provided at the lateral wall (3c,3d) of the support (3) for externally contacting with the lateral wall (4c,4d) of the cover (4) that includes the third pressure means at a predetermined distance from the third positioning surface.

The pressure exerted by the second and/or the third pressure means is preferably lower than the pressure exerted by the flexible tab (17, 17') due to the action of the flexible tabs (17, 17') may be affected by the pressure exerted by the second and/or the third pressure means to the camera unit (2).

As shown for example in FIG. 9 and in the enlarged detail of FIG. 8, when the support (3) and the cover (4) are attached, the lateral walls (4c,4d) of the cover (4) are tightly fitted between the control element (20,20') and the lateral walls (3c,3d) respectively. This also makes the coupling between cover (4) and support (3) more intuitive.

In the embodiment of FIGS. 11 to 14, the camera module (1) also comprises a camera unit (2), a support (3) and a cover (4) attachable to the support (3) and configured to retain the camera unit (2) pressed against the support (3) when the support (3) and the cover (4) are fastened together. The fastening means to attach the support and the cover (3,4) also consist of only two screws (13,13') and corresponding bores hole (14,14') passing through the cover (4) and the support (3).

The cover (4) also has an L-shaped configuration having a vertical part (4b) with a rear window (12) and a horizontal part (4a), and incorporating two flexible tabs (17, 17') placed respectively at the two lateral sides of the vertical part (4b) of the cover (4) in correspondence with the window (12) and providing the same functionality described above with respect to the embodiment of FIGS. 1 to 10.

The cover (4) further comprises a second flexible tab (18) provided at the horizontal part of the (4a) of the cover (4), and configured such as when the cover (4) is fastened with the support (3), the flexible tab (18) presses the camera unit (2) by flexible force against the secondary positioning surface in a direction transverse to the optical axis (X).

Figure 12:
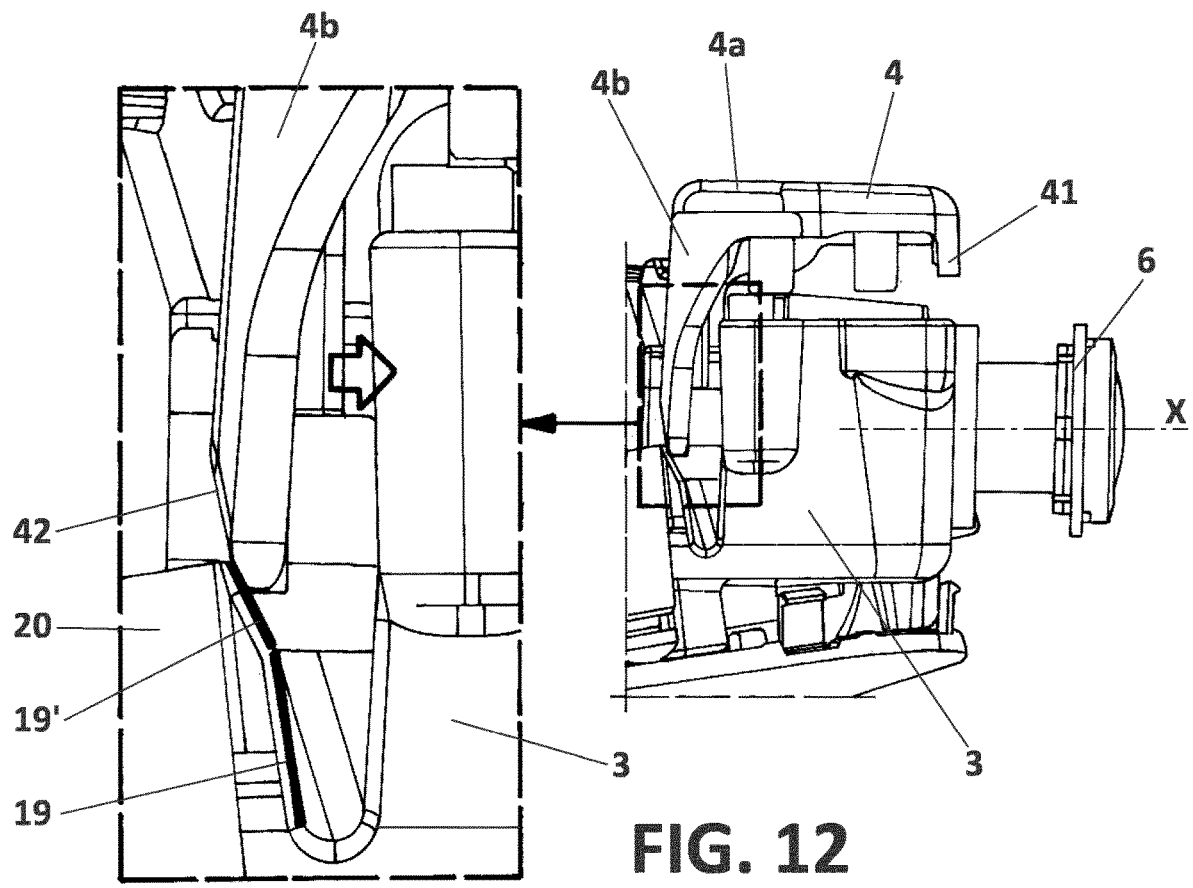
FIG. 12.—shows a side elevational view of the camera module with the cover in a pre-assembly position when it is contacting with the first guide portion, and including an enlarged detail of the part of the cover in contact with the first guide portion.
Figure 13:
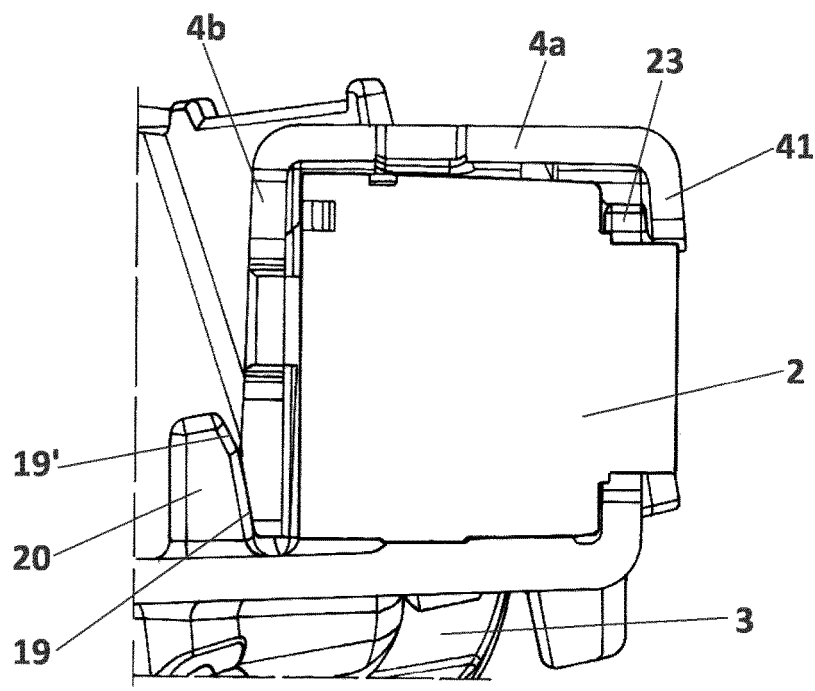
FIG. 13.—shows a side elevational view of the camera module with the cover assembled with the support and camera unit.

In the embodiment of FIGS. 11 to 14, the cover (4) additionally incorporates protruding members (22) provided at the internal surface of the horizontal part (4a) of the cover (4) so that when the cover (4) and the support (3) are operatively coupled, as shown in FIG. 13, these protruding members (22) contact and press on top of the camera unit (2) as to hold the camera unit (2) steady, that is, impeding any undesired misalignment of the optical axis of camera unit.

These protruding members (22) are provided for pressing the camera unit (2) against the secondary reference plane (H') defined in the horizontal part (3b) of the support (3), that is, generally parallel to the optical axis (X) of the camera as shown in FIG. 10.

As represented in FIG. 12 the support (3) has control elements (20,20') (preferably two) having at least one rear surface (19) placed for contacting with the vertical part (4b) in order to gently guide the cover (4) during its assembly to its correct position, so for an operator is simple and intuitive and therefore faster, the assembly process.

Preferably, as more clearly shown in FIGS. 12 and 8, the control elements (20,20') having two consecutive guiding surfaces (19,19') in the form of ramps, each one with different inclinations with the purpose of progressively guiding the cover (4) while it is being coupled with the support (3) to it permanent and final position at the rear part of the camera unit (2) opposite the lens (6).

A first guiding surface (19') formed at the top area of a control element (20), has a certain slope as to first receive the cover (4), whereas a second guiding surface (19), formed right below the first guiding surface (19') has a different slope than the first one (close to the vertical as represented in FIG. 12), as to guide the vertical part (4b) of the cover during its final approach to its definitive position.

Taking the optical axis (x) of the lens (6) as a reference, it could be defined that the first guiding surface (19') is less inclined than the second guiding surface (19).

When the cover (4) is correctly assembled with the support (3), the control element (20) forces the vertical part (4b) to press against the camera unit (2) in the direction of its optical axis as indicated by the arrow in the enlarged detail of FIG. 12.

An external area of the end part of the vertical part (4b) of the cover, preferably is configured as an inclined surface (42) cooperating with the two guiding surfaces (19,19').

Furthermore, the cover (4) has a visor (41) protruding downwards from the front edge of the horizontal part (4a) of the cover (4), in a direction generally parallel to the vertical part (4b). This visor (41) additionally facilitates the process of fixing the cover (4) with the support (3) as illustrated more clearly in FIG. 13. More in detail, the visor (41) and the support are configured in such a way that, when the cover (4) is assembled with the support (3) enclosing a camera unit (2), a part of a front wall (23) of the support (3) is trapped in between a front surface of the camera unit (2) and the visor (41). With this configuration any problems arising any pre-assembly clip (15) (as the one shown for example in FIG. 1), is prevented.

Figure 14A:
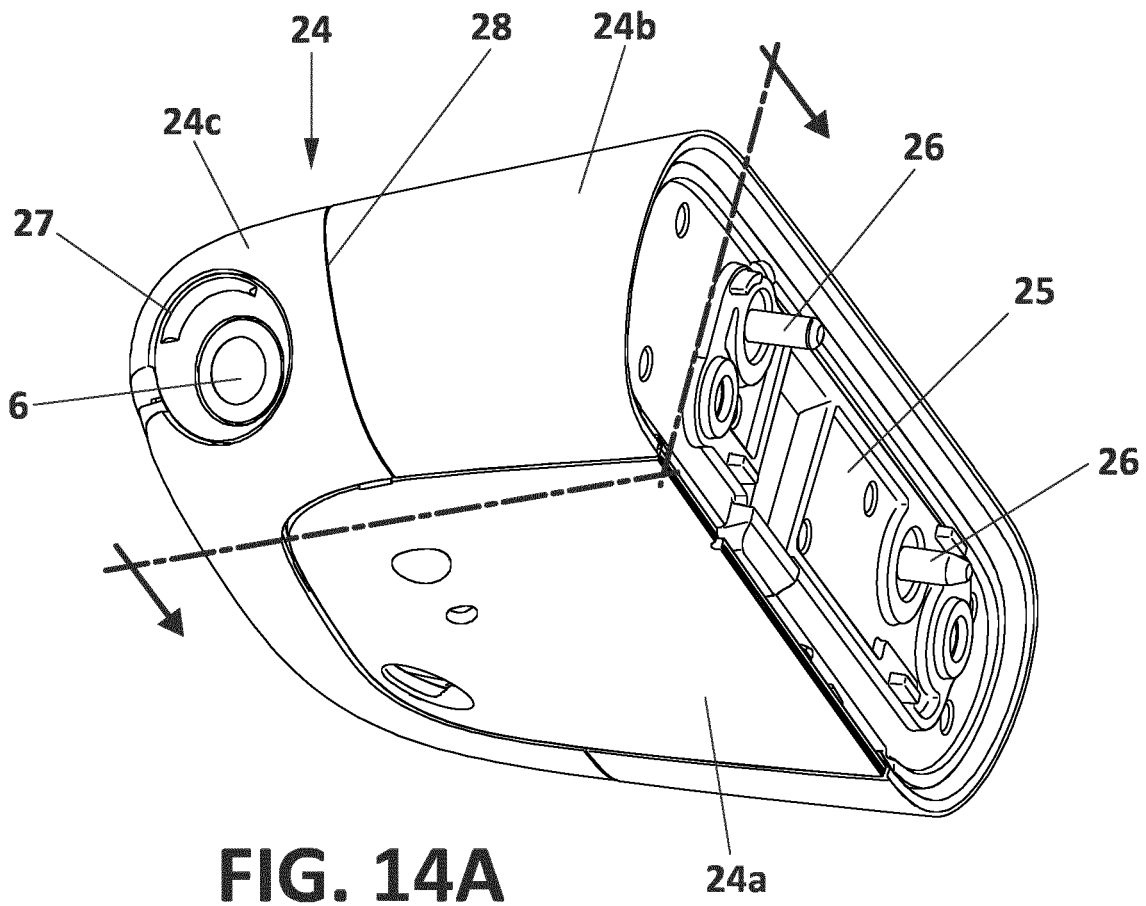
Figure 14B:
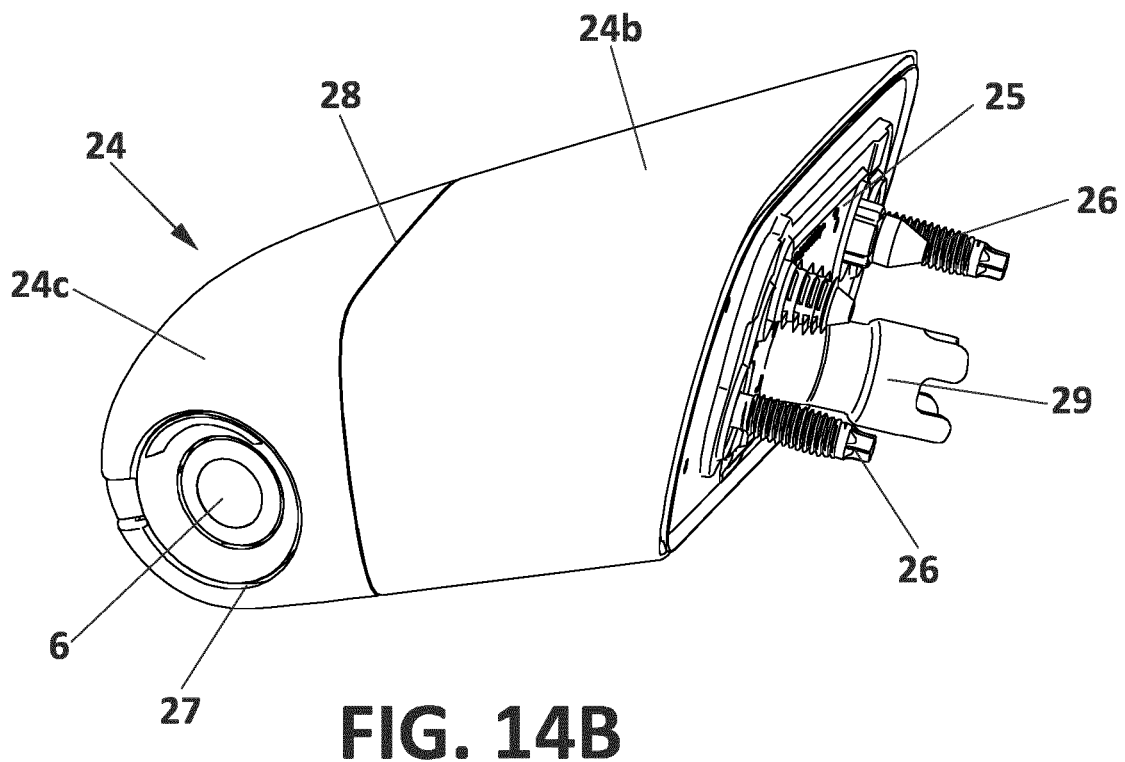
Figure 14C:
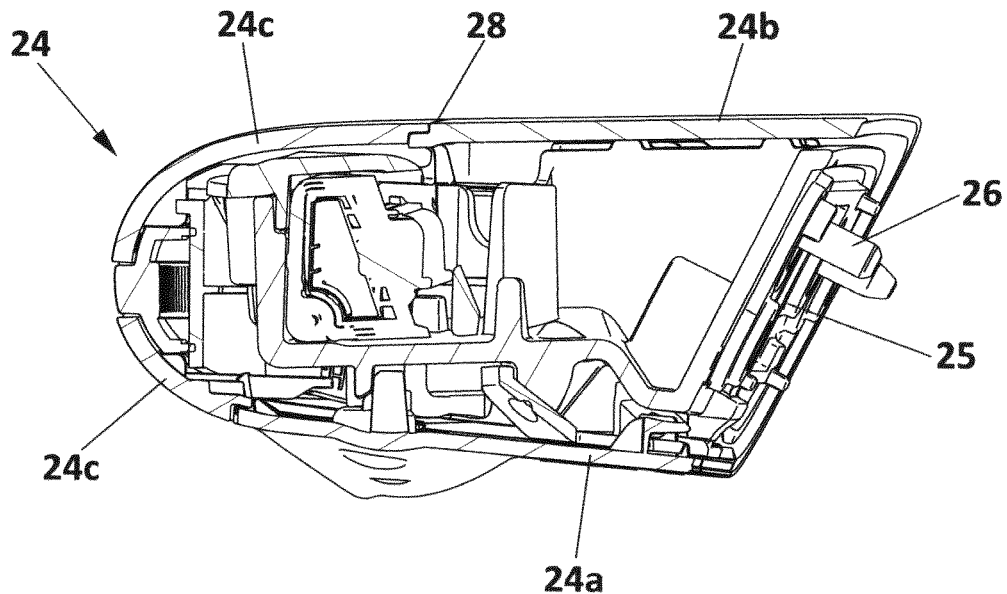
Figure 14D:
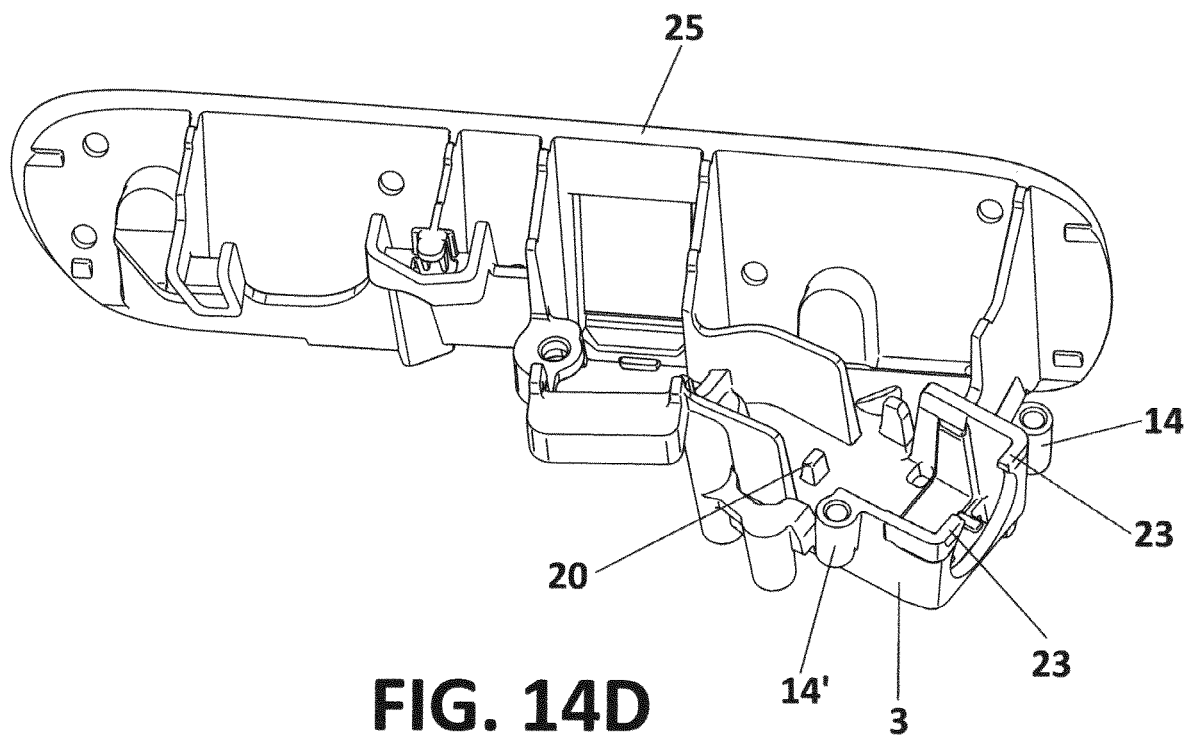

FIGS. 14A, 14 B shows an external housing (24) for a vehicle, adapted to be fixed on an external surface of a vehicle, for example a side door, through its fixation base (25) (generally flat, slightly curved or following the contour of the external surface of the vehicle where it will be installed) and by means of fasteners (26) for example screws of fixations pins. The external housing (24) is configured to be mounted on an external surface of a vehicle, in a position that allows the camera to capture images from rear side areas of the vehicle.

The external housing (24) has an opening (27) for where the lens (6) is allowed to capture images. The housing (24) of this exemplary embodiment, is formed by three parts, a bottom housing part (24a) at the housing bottom (as seen in an operative position of the external housing when it is mounted on a vehicle as described above), and inner housing part (24b), and an outer housing part (24c), so that a separation line (28) is defined between outer and inner housing parts (24b,24c). An electric connection harness (29) passes through the base (25) to connect the camera with an external image processing equipment (not shown) of the vehicle.

As shown in FIG. 14 D, the support (3) for receiving the camera unit (3) is joined with the base (25) of the housing (24) so that in use, the camera unit (3) is protected by the housing (24).

Other preferred embodiments of the present invention are described in the appended dependent claims and the multiple combinations of those claims.

What is claimed is:

1. A camera module for vehicles, the camera module comprising:
   a camera unit comprising: a camera housing and an optical lens supported by the housing and defining a camera optical axis (X),
   a support configured for accommodating the camera unit in a predefined operating position for capturing images,
   a cover attachable to the support and configured to retain the camera unit pressed against the support when the support and the cover are fastened together,
   fastening means to fasten the cover with the support, wherein the fastening means are configured and arranged such as the cover is fastened with the support, and
   first pressure means provided in the cover or in the support, and are configured such as when the cover is fastened with the support, the first pressure means press the camera unit against the support in a direction parallel to the optical axis (X) or perpendicular to the main positioning surface,
   wherein the camera housing has a front contact surface transverse to the optical axis (X), and the support has a main positioning surface also transverse to the optical axis (X), such as when the cover is fastened with the support, the front contact surface of the camera unit and the main positioning surface are in contact and pressed together by the first pressure means;
   wherein the camera housing has a front part and a rear part, both linearly arranged with respect to the optical axis (X), the front part having the lens and the rear part having electric terminals of the camera unit, and wherein the vertical part of the support has a front window in the main positioning surface, and the front part of the camera unit passes through that window and protrudes outside the support, and wherein the vertical part of the cover has a rear window and the rear part of the camera unit passes through the rear window and protrudes outside the cover.

2. The camera module according to claim 1, wherein the fastening means to fasten the cover with the support are configured and arranged such as the cover is fastened with the support in a direction transverse to the optical axis (X).

3. The camera module according to claim 1, wherein the support has a control element extending from a horizontal part of the support, and configured for externally contacting with a vertical part of the cover, and wherein the cover is dimensioned to fit between the control element and the camera unit.

4. The camera module according to claim 1, wherein the support has a portion with at least a generally L-shaped configuration having a vertical part and a horizontal part, the vertical part having the main positioning surface,
   wherein the cover also has a portion having a vertical part and a horizontal part, and
   wherein the support and the cover are configured such as when they are fastened, the vertical parts of the support and the cover are generally parallel to each other, and the horizontal parts of the support and the cover are generally parallel to each other.

5. The camera module according to claim 1, wherein the fastening means include two screws whose screwing axis are transverse to the optical axis (X), and wherein the screws are accessible from the outside of the horizontal part of the cover, wherein the optical axis (X) is transverse to a plane that includes the screwing axis.

6. The camera module according to claim 1, wherein the cover also comprises second pressure means configured such as when the cover is fastened with the support, the second pressure means presses the camera unit against a secondary positioning surface defined in the horizontal part of the support in a direction transverse to the optical axis (X).

7. The camera module according to claim 1, wherein the support has at least one lateral wall, wherein the cover also comprises one lateral wall, and wherein at least one lateral wall of the cover includes third pressure means configured to press the camera module against a third positioning surface are defined in one of the lateral walls of the support in a direction transverse to the optical axis (X).

8. The camera module according to claim 7, wherein the first or second or third pressure means comprise at least one flexible tab configured to press the camera unit by flexible deformation when the cover is operatively fastened to the support.

9. The camera module according to claim 1, wherein the cover incorporates protruding members provided at an internal surface of the horizontal part of the cover so that when the cover and the support are operatively coupled, the protruding members contact and press on the camera unit in a direction transverse to the optical axis.

10. A camera module for vehicles, the camera module comprising:
a camera unit comprising: a camera housing and an optical lens supported by the housing and defining a camera optical axis (X),
a support configured for accommodating the camera unit in a predefined operating position for capturing images,
a cover attachable to the support and configured to retain the camera unit pressed against the support when the support and the cover are fastened together,
fastening means to fasten the cover with the support, wherein the fastening means are configured and arranged such as the cover is fastened with the support, and
first pressure means provided in the cover or in the support, and are configured such as when the cover is fastened with the support, the first pressure means press the camera unit against the support in a direction parallel to the optical axis (X) or perpendicular to the main positioning surface,
wherein the camera housing has a front contact surface transverse to the optical axis (X), and the support has a main positioning surface also transverse to the optical axis (X), such as when the cover is fastened with the support, the front contact surface of the camera unit and the main positioning surface are in contact and pressed together by the first pressure means;
further comprising cooperating engaging means for retaining the cover and the support pre-assembled together before and while they are fastened;
wherein the cooperating engaging means comprises a front flexible tab formed in the cover that engages by flexible deformation with a protrusion formed at the vertical part of the support.

11. The camera module according to claim 10, wherein the fastening means to fasten the cover with the support are configured and arranged such as the cover is fastened with the support in a direction transverse to the optical axis.

12. The camera module according to claim 10, wherein the support has a control element extending from a horizontal part of the support, and configured for externally contacting with a vertical part of the cover, and wherein the cover is dimensioned to fit between the control element and the camera unit.

13. The camera module according to claim 10, wherein the support a vertical part and a horizontal part, the vertical part having the main positioning surface, and wherein the cover also has a vertical part and a horizontal part, and wherein the support and the cover are configured such as when they are fastened, the vertical parts of the support and the cover are generally parallel to each other, and the horizontal parts of the support and the cover are generally parallel to each other.

14. The camera module according to claim 10, wherein the fastening means comprise two screws whose screwing axis are transverse to the optical axis (X), and wherein the two screws are accessible from the outside of the horizontal part of the cover, and wherein the optical axis (X) is transverse to a plane that includes the screwing axis.

15. A camera module for vehicles, the camera module comprising:
a camera unit comprising: a camera housing and an optical lens supported by the housing and defining a camera optical axis (X),
a support configured for accommodating the camera unit in a predefined operating position for capturing images,
a cover attachable to the support and configured to retain the camera unit pressed against the support when the support and the cover are fastened together,
fastening means to fasten the cover with the support, wherein the fastening means are configured and arranged such as the cover is fastened with the support, and
first pressure means provided in the cover or in the support, and are configured such as when the cover is fastened with the support, the first pressure means press the camera unit against the support in a direction parallel to the optical axis (X) or perpendicular to the main positioning surface,
wherein the camera housing has a front contact surface transverse to the optical axis (X), and the support has a main positioning surface also transverse to the optical axis (X), such as when the cover is fastened with the support, the front contact surface of the camera unit and the main positioning surface are in contact and pressed together by the first pressure means;
wherein at least one control element has two consecutive guiding surfaces each one with different inclinations for guiding the cover while it is being coupled with the support.

16. The camera module according to claim 15, wherein the fastening means to fasten the cover with the support are configured and arranged such as the cover is fastened with the support in a direction transverse to the optical axis.

17. The camera module according to claim 15, wherein the support comprises a control element extending from a horizontal part of the support, and configured for externally contacting with a vertical part of the cover, and wherein the cover is dimensioned to fit between the control element and the camera unit.

18. The camera module according to claim 17, wherein the control element comprises at least one rear surface that is faced to the main positioning surface which contacts with the vertical part of the cover.

19. The camera module according to claim 15, wherein the support comprises a vertical part and a horizontal part, the vertical part having the main positioning surface, and wherein the cover also comprises a vertical part and a horizontal part, and wherein the support and the cover are configured such as when they are fastened, the vertical parts of the support and the cover are generally parallel to each other, and the horizontal parts of the support and the cover are generally parallel to each other.

20. The camera module according to claim 15, wherein the fastening means comprise two screws whose screwing axis are transverse to the optical axis (X), and wherein the two screws are accessible from the outside of the horizontal part of the cover, wherein the optical axis (X) is transverse to a plane that includes the screwing axis.

\* \* \* \* \*